J. W. F. HOW.
Churns.

No. 133,940. Patented Dec. 17, 1872.

Witnesses.
C. H. Poole
Harry Coleman

Jas. W. F. How,
Inventor,
By J. McC. Perkins
Atty

UNITED STATES PATENT OFFICE.

JAMES WILLIAM FISHBACK HOW, OF DOUGLAS COUNTY, OREGON.

IMPROVEMENT IN CHURNS.

Specification forming part of Letters Patent No. 133,940, dated December 17, 1872.

*To all whom it may concern:*

Be it known that I, JAMES W. F. HOW, of the county of Douglas and State of Oregon, have invented certain new and useful Improvements in Churns; and do hereby declare the following to be a full, clear, and exact description thereof, reference being had to the accompanying drawing, and to the letters of reference marked thereon.

The nature of my invention consists in the construction and arrangement of a churn, as will be hereinafter more fully set forth.

In order to enable others skilled in the art to which my invention appertains to make and use the same, I will now proceed to describe its construction and operation, referring to the annexed drawing, which forms a part of this specification, and in which—

Figure 1:
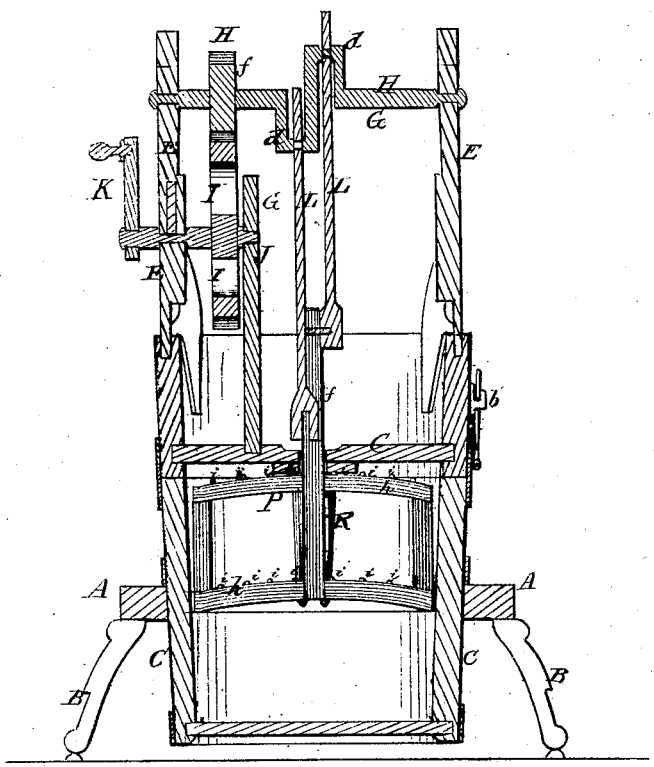
Figure 2:
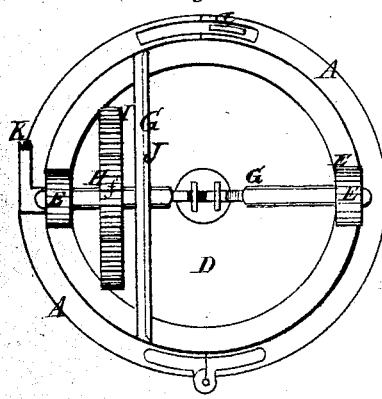
Figure 3:
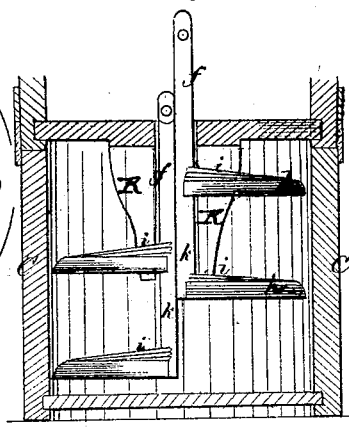
Figure 4:
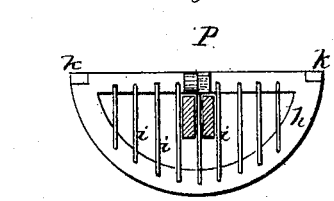

Figure 1 is a longitudinal vertical section; Fig. 2, a plan view of my entire churn; Fig. 3 is a transverse vertical section of the churn proper; and Fig. 4 is a plan view of one of the dashers.

A represents a circular frame made in two equal parts, hinged together at one side and fastened at the other by a draw-key, *a*. This frame is supported by legs B B and is for the purpose of receiving and supporting the churn C to steady the same when in operation. The churn C which contains the milk or cream is round, as shown, and tapering, so that the bottom is smaller than the top, thereby allowing the butter to gather at the top out of the way of the dashers, and the dashers to play up and down in the center and leave the butter on the outer edges of the same. D represents the lid, made in the form of a shallow tub, and fastened to the top of the churn C by two or more lock loops or catches, *b b*, of any suitable construction. On the lid D are two upright standards, E E, in the upper ends of which a shaft, G, has its bearings. Near one end, on the shaft, is placed a pinion, H, which meshes with a cog-wheel, I, having its journal bearings in one of the standards E and in a dash-board, J. This dash-board is placed across the lid or tub D on one side of the center, and prevents the milk which splashes up from the churn from coming in contact with the gear-wheels. On the outer journal of the cog-wheel I is a crank, K, for turning the same, and by which motion is given to the shaft G. The shaft G is formed in the center with two cranks *d d* extending in opposite directions, and upon which cranks are placed pitmen L L, having their lower ends attached to the dasher-rods *f f*, projecting upward through an aperture in the center of the lid D. P P represent the dashers, each of which is formed of two semicircular frames, *h*, placed one above the other, and the rod *f* passes down in the center of their straight sides and is attached firmly to both. The corners of the frames are also connected by vertical bars *k*. The frames *h h* are dished on the under sides, as shown in Figs. 1 and 3, and are provided with wires *i i* running crosswise, as shown in Fig. 4. These wires cut the milk or cream fast and make it yield up the butter very quickly and with but little labor. From the under side of the lid D project downward into the churn guides R R, between which the dasher-rods *f f* are placed and move up and down, thus preventing any wabbling of the dashers, but insuring a perfectly-steady up-and-down motion. These guides are slotted so that the center wires of the dashers may pass up into them.

The operation of this churn is readily seen, the revolution of the shaft G causing the dashers P P to move rapidly up and down in opposite directions—one up and the other down, and vice versa.

Having thus fully described my invention, what I claim as new, and desire to secure by Letters Patent, is—

1. The slotted guides R R in combination with the dasher P, the tub-lid D, and the dash-board J, substantially as and for the purposes herein set forth.

2. The dash-board J, arranged in the lid D, substantially as and for the purposes herein set forth.

3. The dasher P, constructed as described, of the semicircular dished frames *h h* with wires *i i*, and provided with dasher-rods *f f*, all substantially as and for the purposes herein set forth.

4. The slotted guides R R projecting downward from the lid D, substantially as and for the purposes herein set forth.

In testimony that I claim the foregoing I have hereunto set my hand and seal this 22d day of August, 1872.

JAMES WILLIAM FISHBACK HOW. [L. S.]

Witnesses:
AUGUSTUS FERDINAND WHEELER.
JOSIAH SAMUEL PURDOM.